April 17, 1962 W. H. GRANT 3,029,954

ADJUSTABLE BOOM CRANE

Filed Feb. 24, 1959 14 Sheets-Sheet 1

INVENTOR.
William H. Grant
BY
John J. McLaughlin
Attorney

INVENTOR.
William H. Grant
BY John J. McLaughlin
Attorney

April 17, 1962 W. H. GRANT 3,029,954

ADJUSTABLE BOOM CRANE

Filed Feb. 24, 1959 14 Sheets-Sheet 3

INVENTOR.

William H. Grant

BY

John J. McLaughlin

Attorney

INVENTOR.
William H. Grant
BY
John J. McLaughlin
Attorney

INVENTOR.
William H. Grant
BY
John J. McLaughlin
Attorney

April 17, 1962 W. H. GRANT 3,029,954

ADJUSTABLE BOOM CRANE

Filed Feb. 24, 1959 14 Sheets-Sheet 6

INVENTOR.

William H. Grant

BY

John J. McLaughlin

Attorney

April 17, 1962 W. H. GRANT 3,029,954

ADJUSTABLE BOOM CRANE

Filed Feb. 24, 1959 14 Sheets-Sheet 7

INVENTOR.
William H. Grant
BY
John J. McLaughlin
Attorney

INVENTOR.
William H. Grant
BY
John J. McLaughlin
Attorney

April 17, 1962 W. H. GRANT 3,029,954

ADJUSTABLE BOOM CRANE

Filed Feb. 24, 1959 14 Sheets-Sheet 9

INVENTOR.
William H. Grant
BY John J. McLaughlin
Attorney

April 17, 1962 W. H. GRANT 3,029,954

ADJUSTABLE BOOM CRANE

Filed Feb. 24, 1959 14 Sheets-Sheet 10

INVENTOR.
William H. Grant
BY John J. McLaughlin
Attorney

April 17, 1962 W. H. GRANT 3,029,954

ADJUSTABLE BOOM CRANE

Filed Feb. 24, 1959 14 Sheets-Sheet 11

INVENTOR.

William H. Grant

BY John J. McLaughlin

Attorney

April 17, 1962 W. H. GRANT 3,029,954

ADJUSTABLE BOOM CRANE

Filed Feb. 24, 1959 14 Sheets-Sheet 12

INVENTOR.
William H. Grant
BY
John J. McLaughlin
Attorney

April 17, 1962 W. H. GRANT 3,029,954

ADJUSTABLE BOOM CRANE

Filed Feb. 24, 1959 14 Sheets-Sheet 13

INVENTOR.
William H. Grant
BY John J. McLaughlin
Attorney

April 17, 1962 W. H. GRANT 3,029,954

ADJUSTABLE BOOM CRANE

Filed Feb. 24, 1959 14 Sheets-Sheet 14

INVENTOR.
William H. Grant
BY
John J. McLaughlin
Attorney 3,029,954

ADJUSTABLE BOOM CRANE

William H. Grant, 4767 E. 4th St., Tucson, Ariz.

Filed Feb. 24, 1959, Ser. No. 795,022
17 Claims. (Cl. 212—55)

My invention relates in general to cranes and booms therefor; it relates more in particular to a truck type crane in which the length of the boom is adjustable mechanically.

Cranes are of many types and used for many purposes where the requirement is to move or control a relatively heavy object. All cranes comprise basically a fixed or movable type body in which the various controls and cable-controlling drums are housed, and a boom projecting at an adjustable angle from the supporting body with at least one load cable for lifting or controlling the movement of a heavy object below the boom tip. Booms are required to be of different lengths, depending upon the specific functions which they are to perform and the environment in which they are used. Adjustable type booms are known in the prior art, but in general they have comprised relatively small members in which adjustability is controlled by hydraulic movement of the boom tip section.

A common type of crane is mounted on a truck body and may have a boom running anywhere from thirty or forty feet to in excess of one hundred feet. This type of crane is frequently constructed with a sectional boom comprising a butt section, a tip section, and filler sections of various lengths. When it is desired to take such a crane out to a given location to perform a given job, it is first necessary to determine the length of the boom which will be required. The common expression is "How much stick will I need?" The length of the boom is adjusted conventionally by paying out on the head cable until the boom lies along the ground. The sections are then separated by removing bolts or pins connecting them together, and another crane is commonly used to remove, replace and/or insert one or more filler sections to obtain the proper length boom. The various sections are then secured together, the crane cables commonly being used to help in assembly. This operation may take several hours of at least two men's time and is therefore a costly one. As a consequence, frequently the boom operator will try to make the boom length which happens to be set up at the time do a new job requirement, and he may then find when he gets out on the job that he would prefer to have a somewhat longer or shorter boom for best results. The consequence then is that the actual work of the crane will take longer or be less effective than if the optimum length of boom had been set up.

The principal object of my present invention is the provision of an adjustable length boom which can be operated substantially like a conventional crane in which the length of the boom is not adjustable.

Another object is the provision of an improved adjustable boom in which the adjustment in length may take place at the time a load is being supported.

Still another object is the provision of a crane in which the length of the boom is adjustable and the position of the load may be simultaneously controlled.

A further object is to provide a crane with an adjustable length boom in which the load cable and head cable are automatically controlled in response to control of the boom length.

A still further object is the provision of an adjustable length boom for a crane having a butt, tip and at least one filler section, and wherein the number of filler sections may be varied in accordance with the overall adjustment desired.

Still another object of the invention is the provision of a crane in which the boom comprises a plurality of mutually telescoping sections with cable means at all times under the control of the operator for determining the boom's length.

Still another object is the provision of an adjustable boom crane in which the adjustment of the boom may comprise still another control, not heretofore available in crane operating practice, for manipulating a load being carried by the load cable.

Other specific objects and features of the invention will be apparent from the following detailed description taken with the accompanying drawings showing an illustrative embodiment of my invention. In the drawings.

Figures 1, 24:
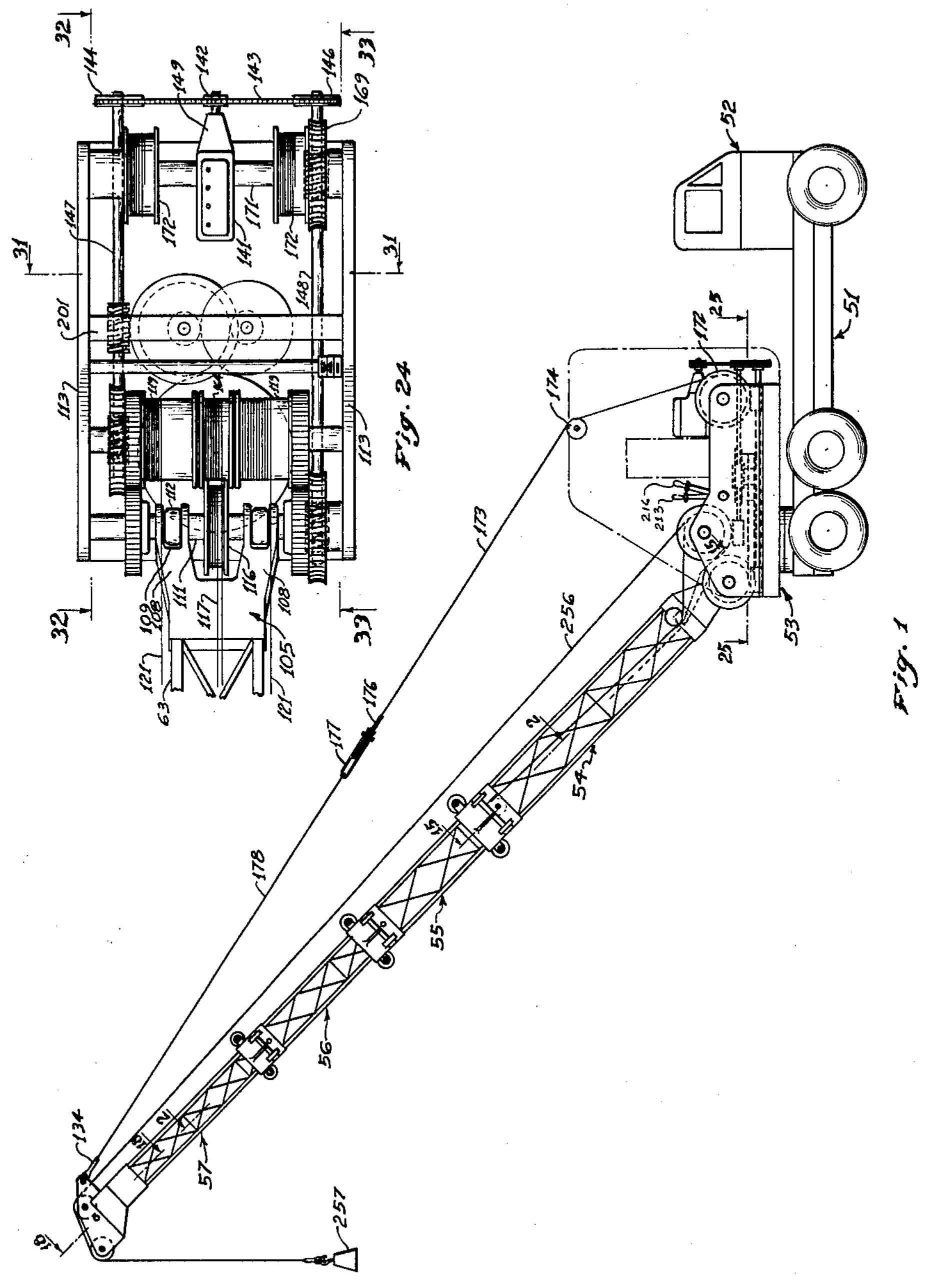
FIG. 1 is a side elevational view showing a complete truck type crane embodying the features of my invention.
Figure 4:
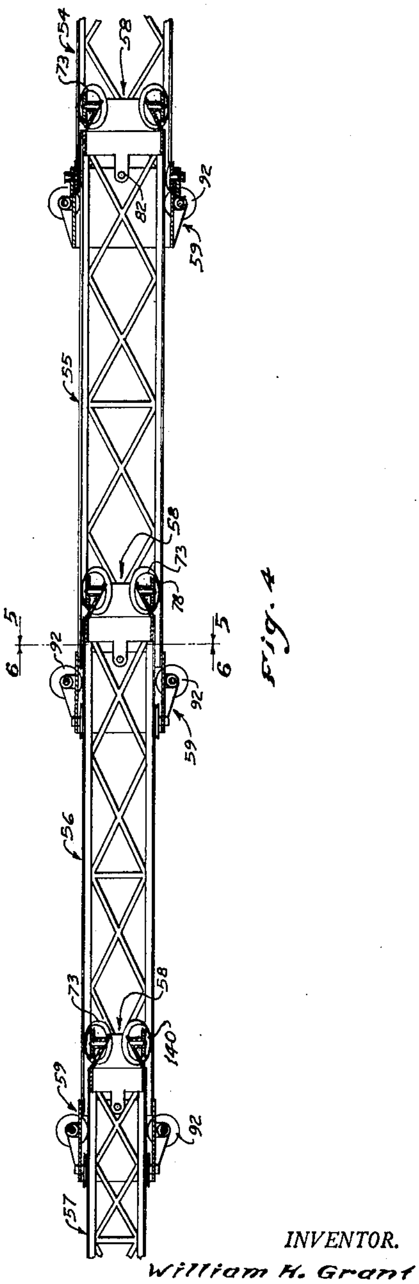
FIG. 4 is a sectional view similar to FIG. 2 but showing the position which the boom sections assume when the boom is fully extended.
Figures 5, 6, 13, 14:
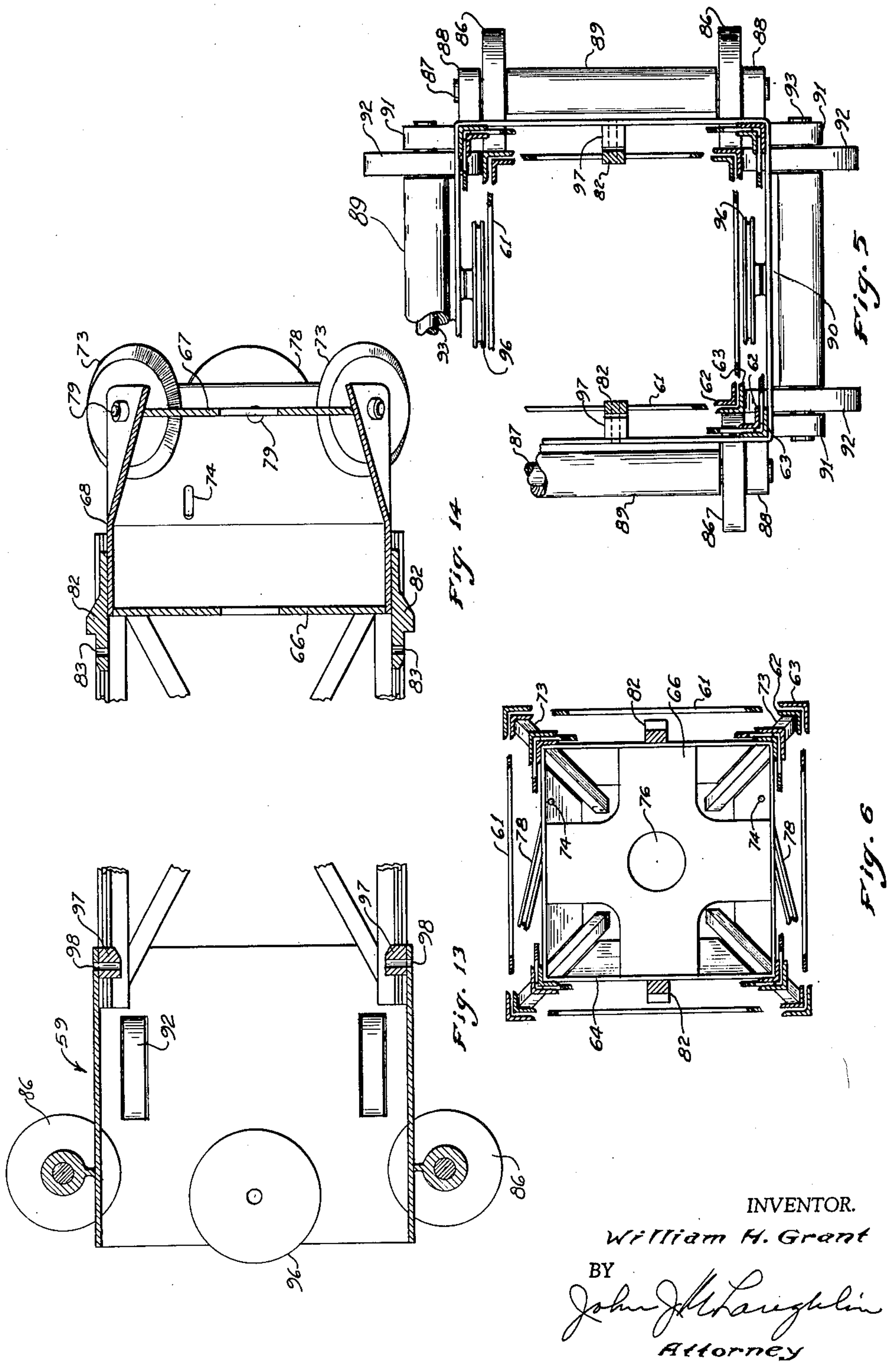
Figure 7:
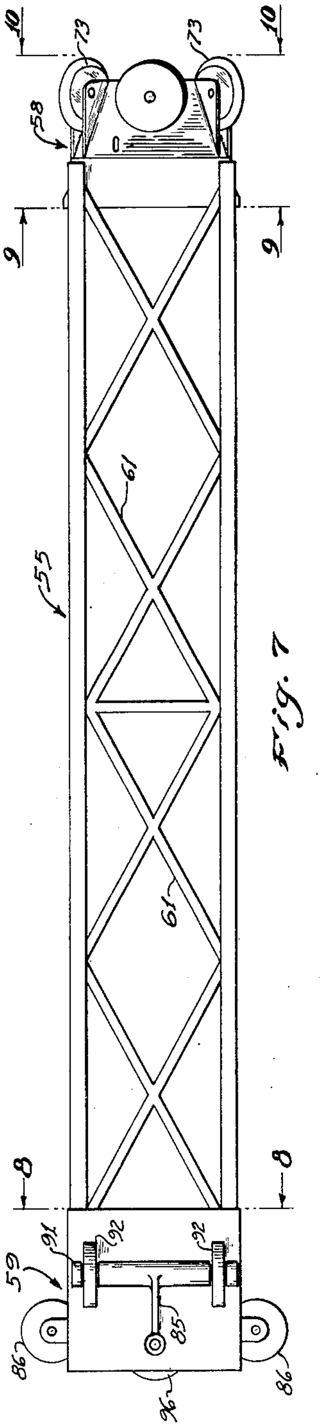
Figure 9:
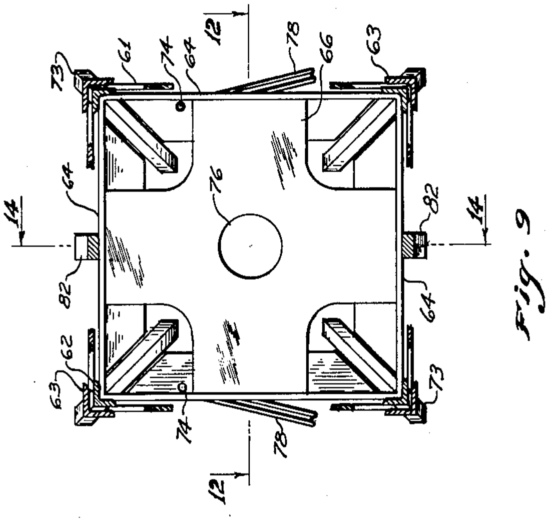
Figure 8:
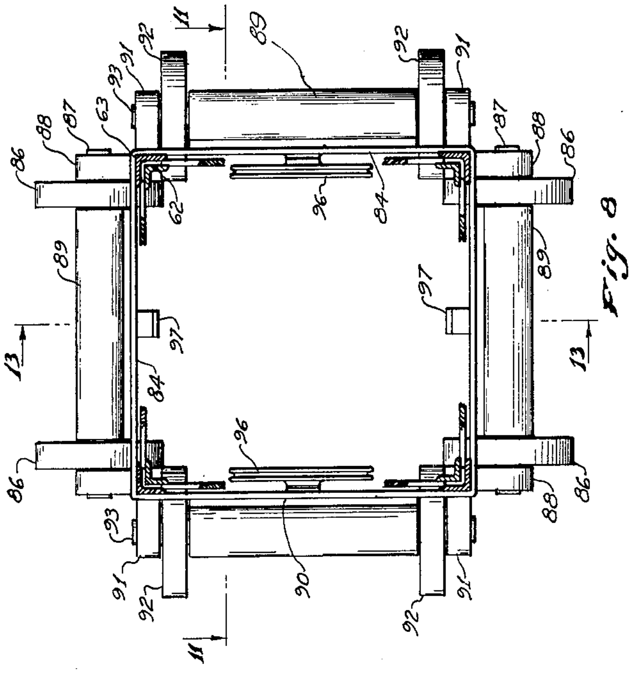
Figures 10, 11, 12:
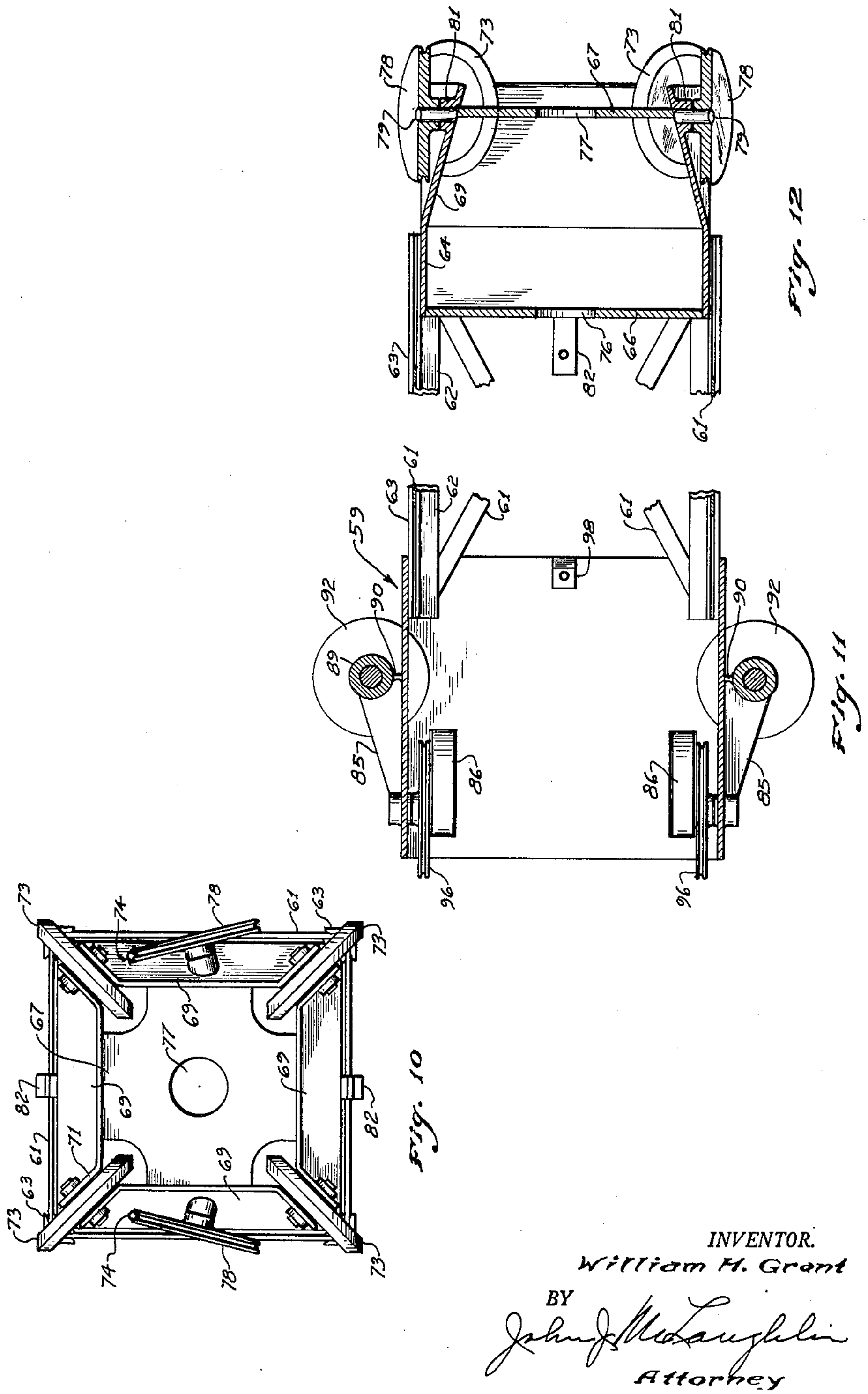
Figures 15, 16:
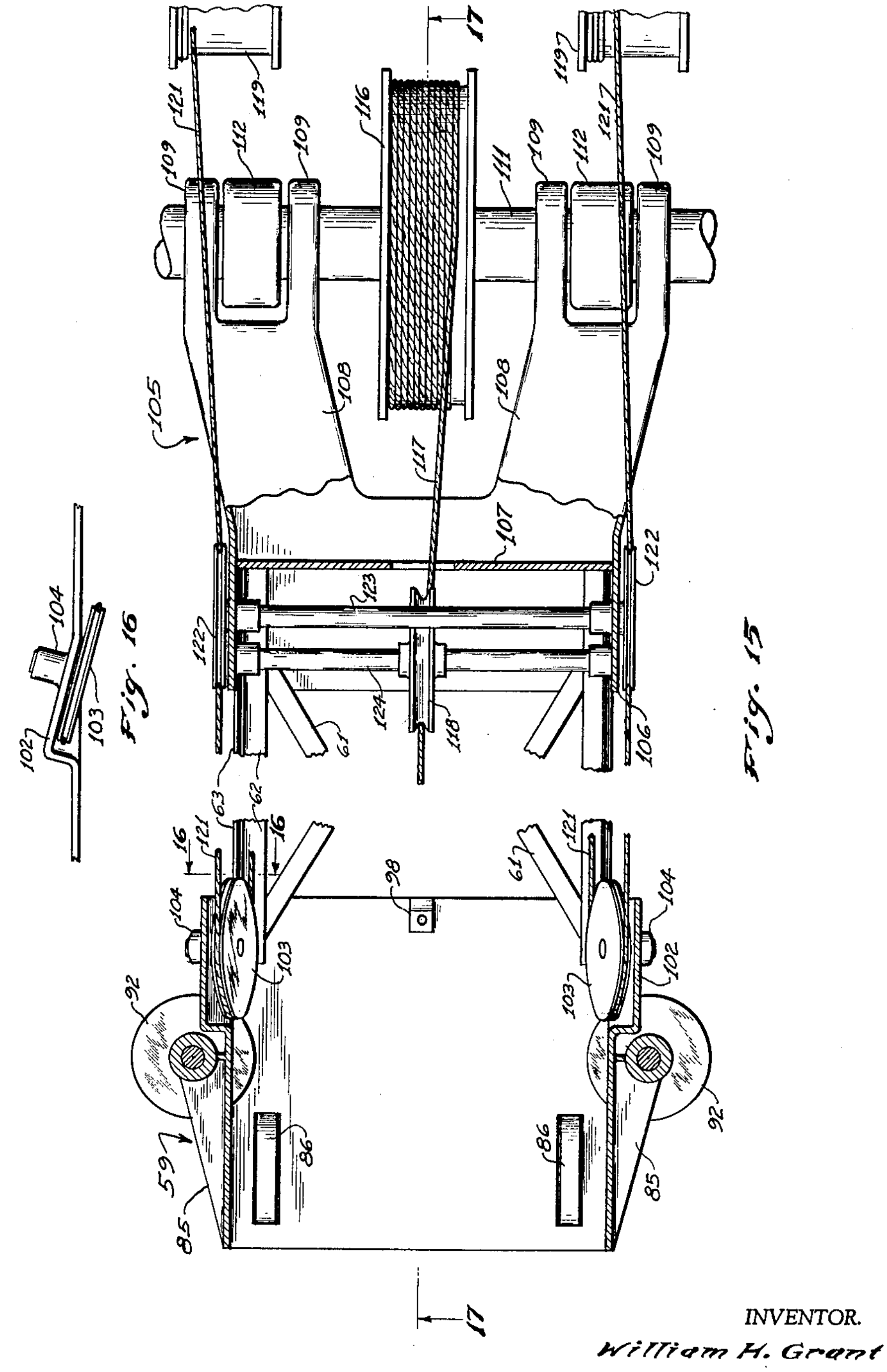
Figure 17:
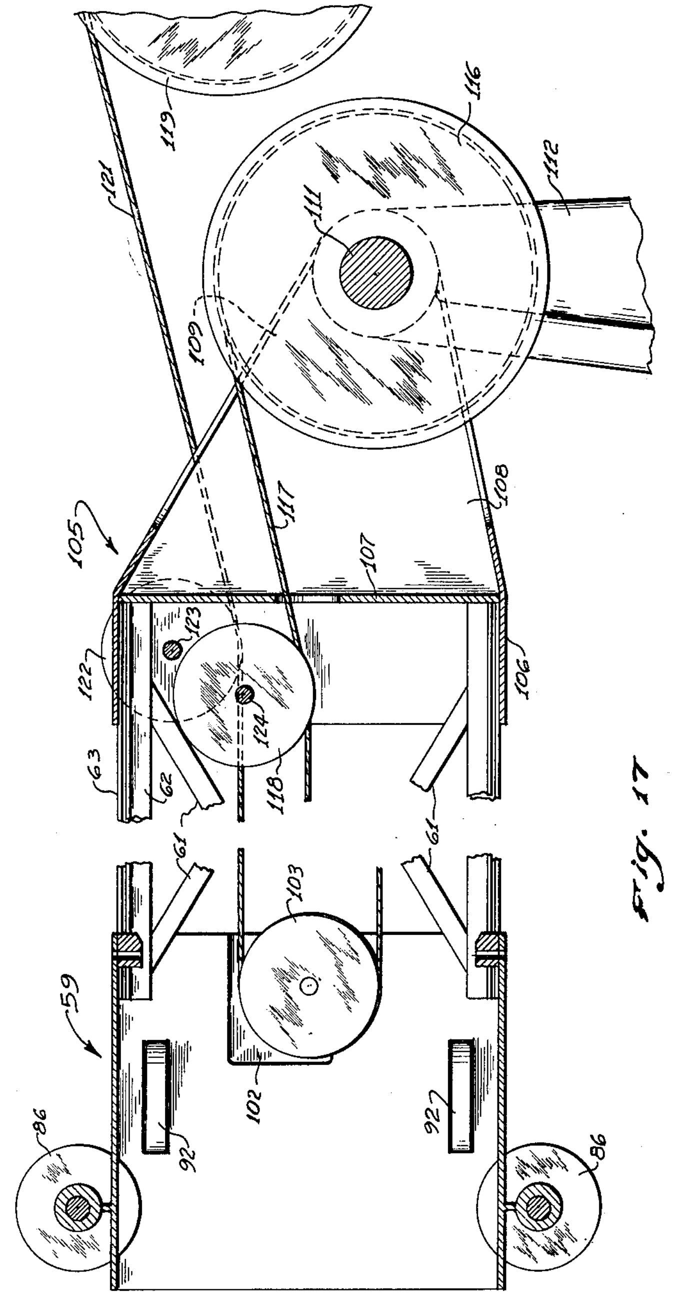
Figures 18, 19:
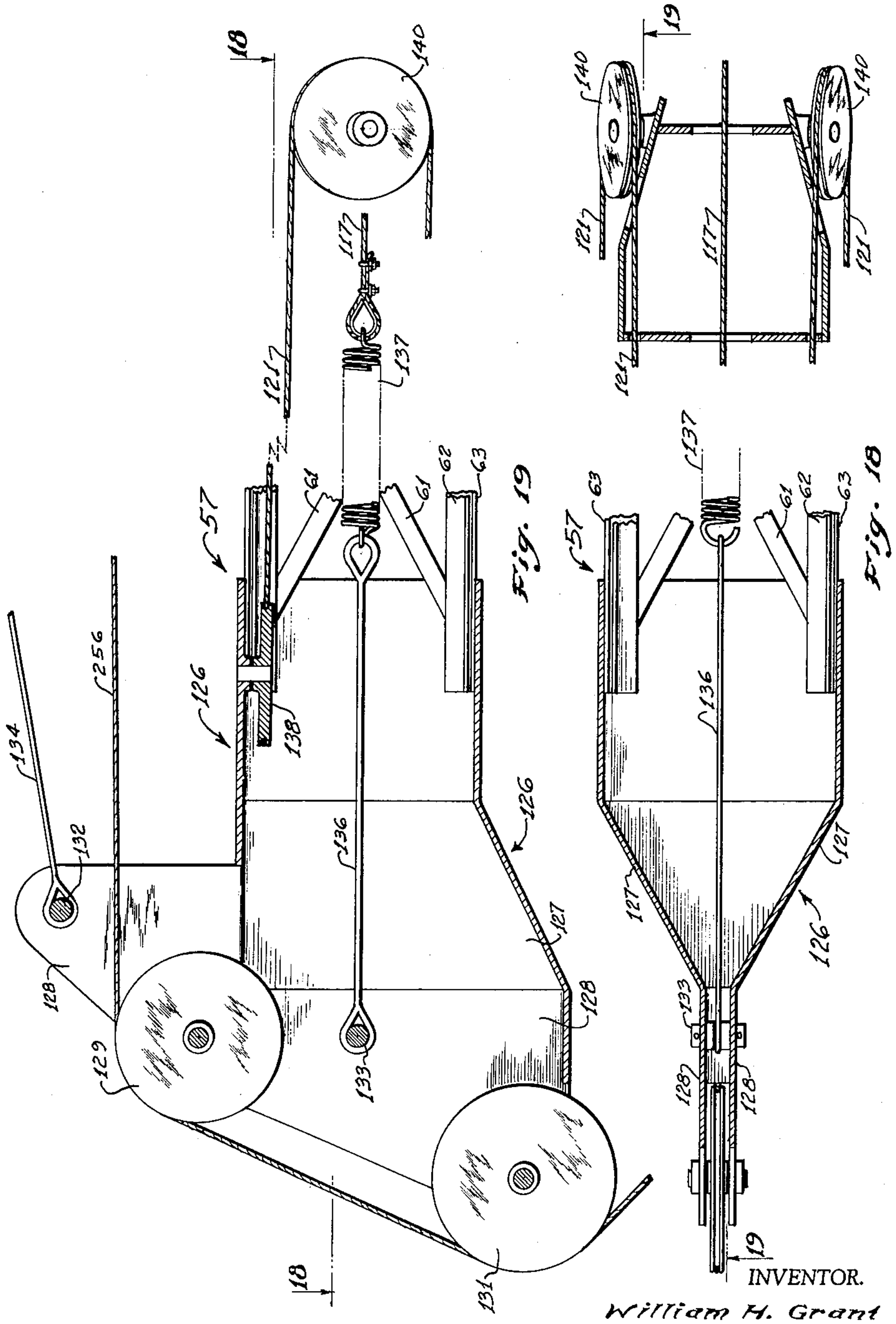
Figure 20:
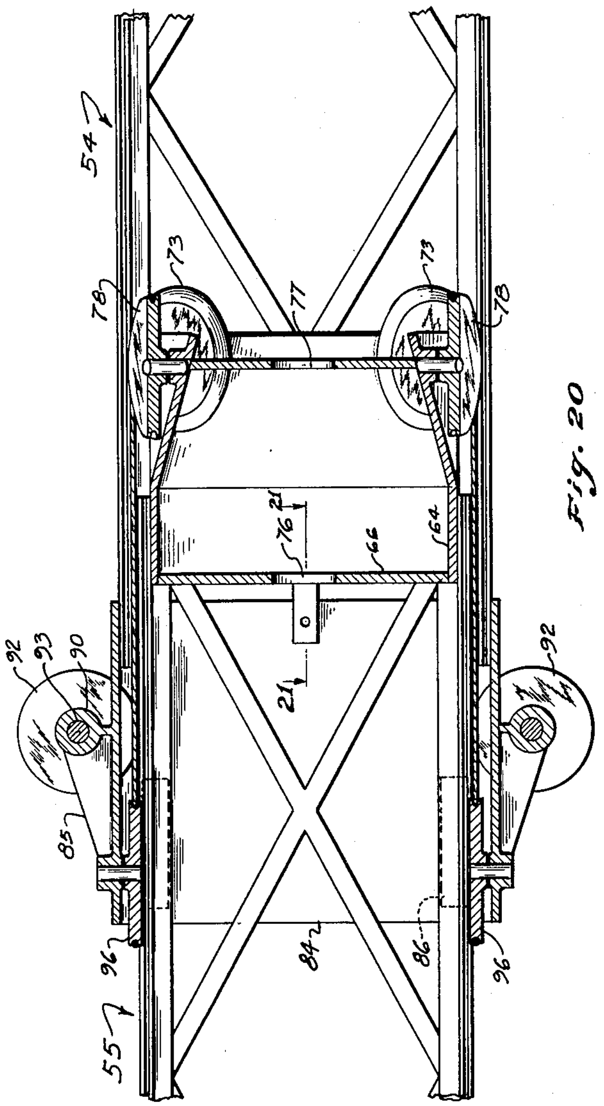
Figure 22:
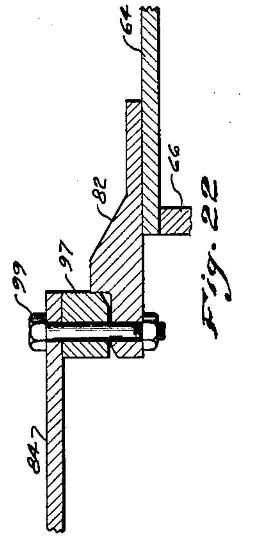
Figure 21:
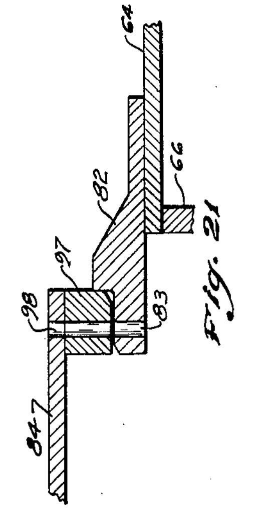
Figure 23:
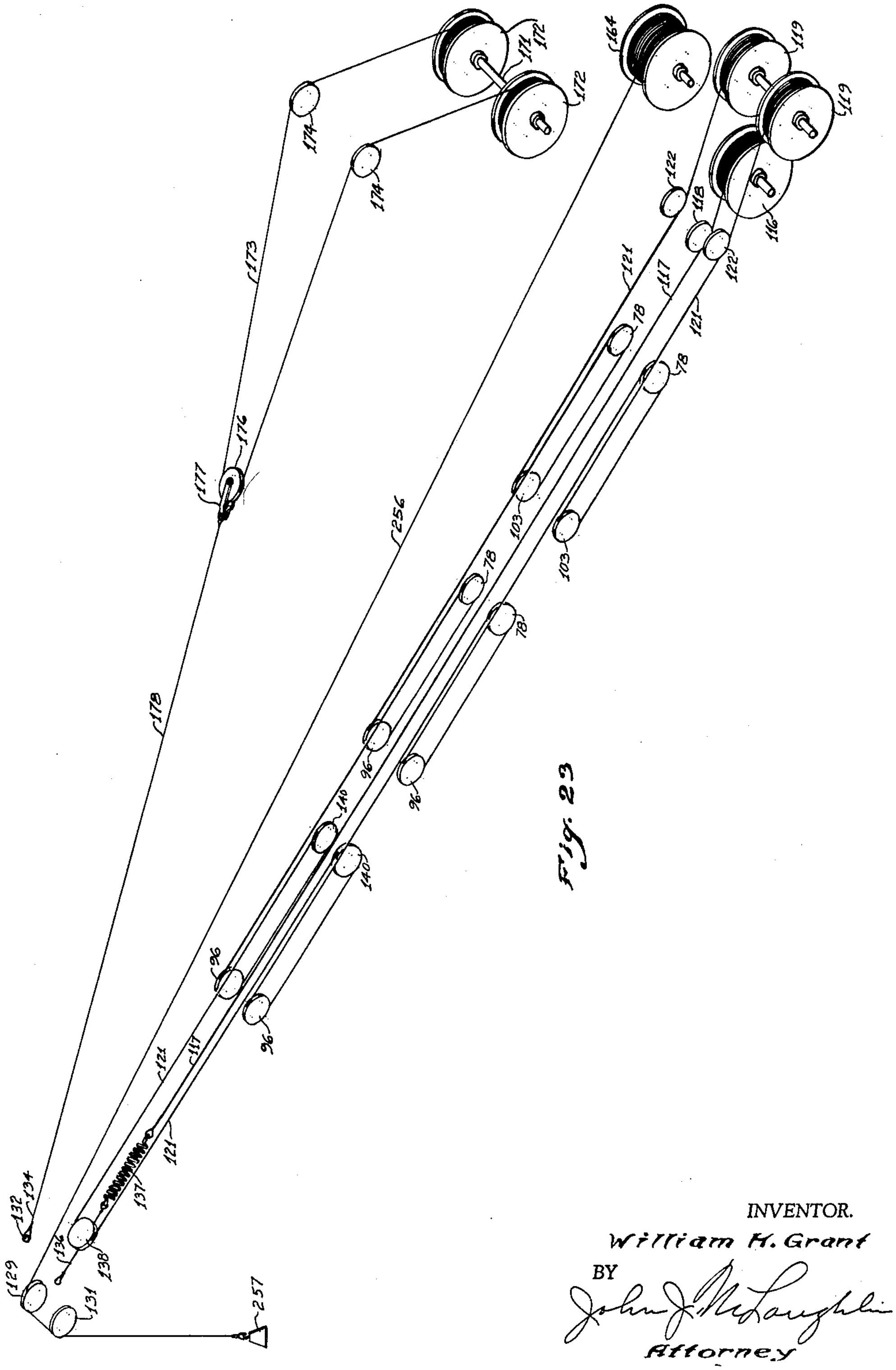
Figure 25:
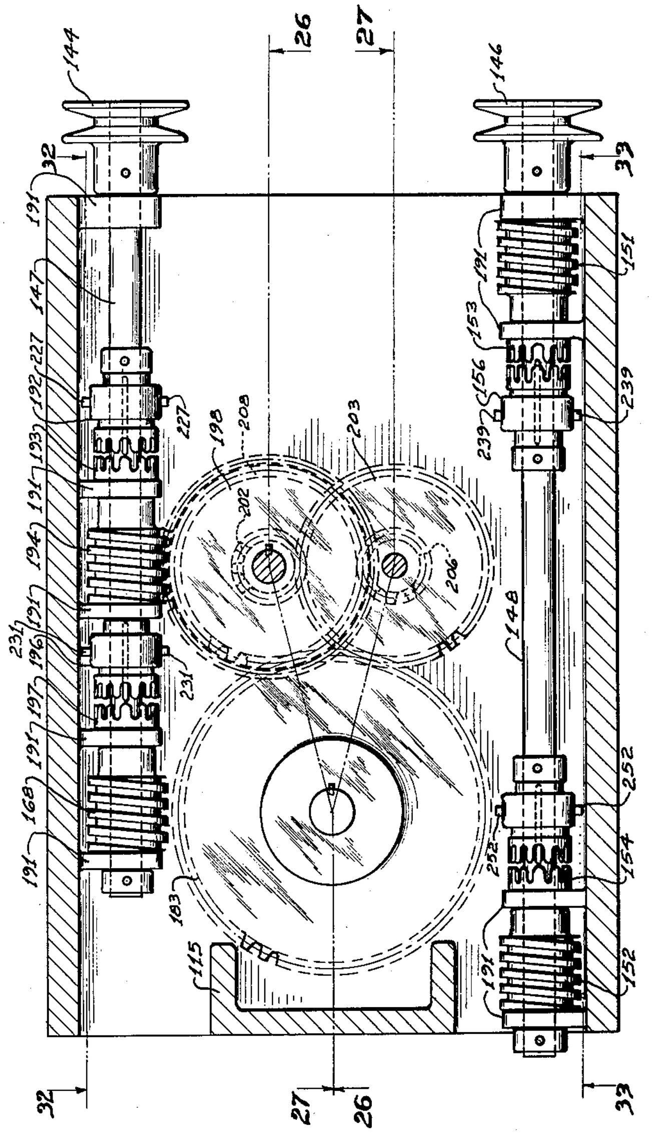
Figure 26:
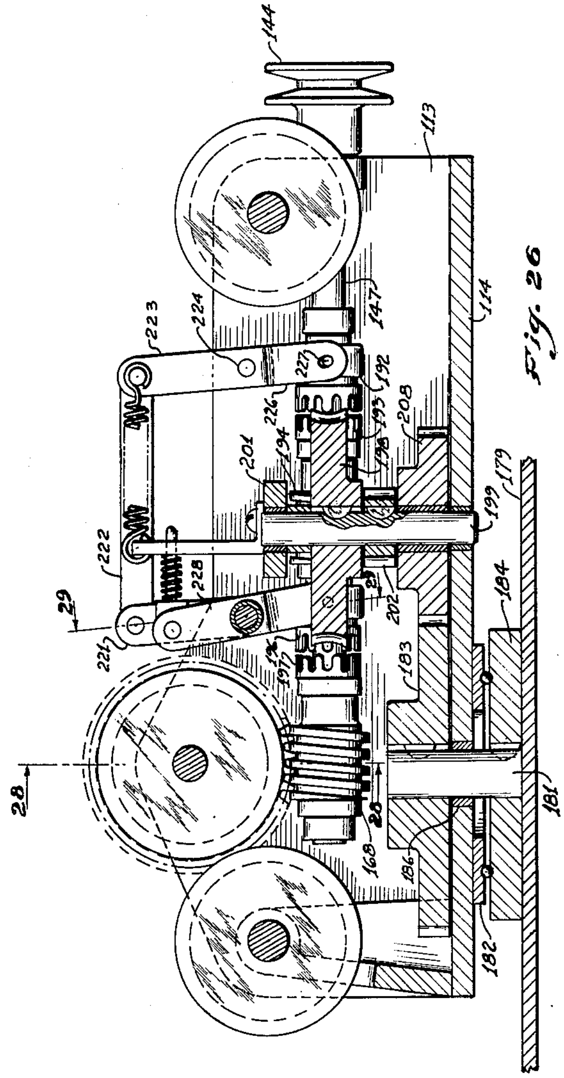
Figure 28:
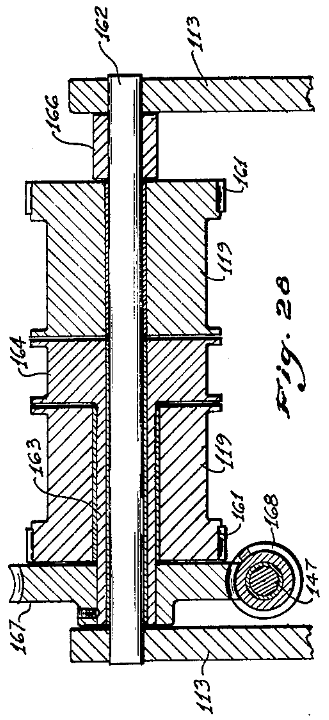
Figures 27, 29, 30:
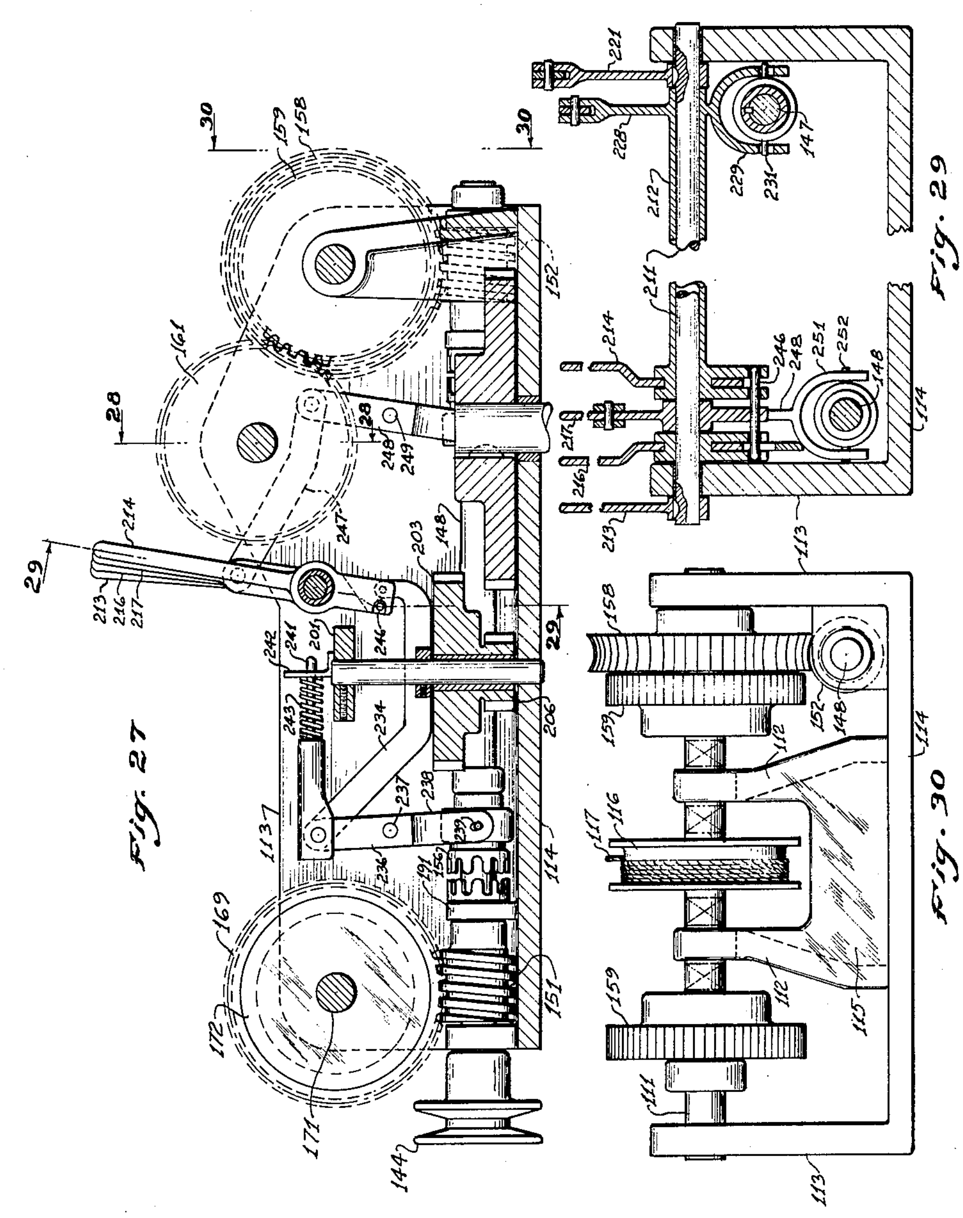
Figures 31, 32, 33:
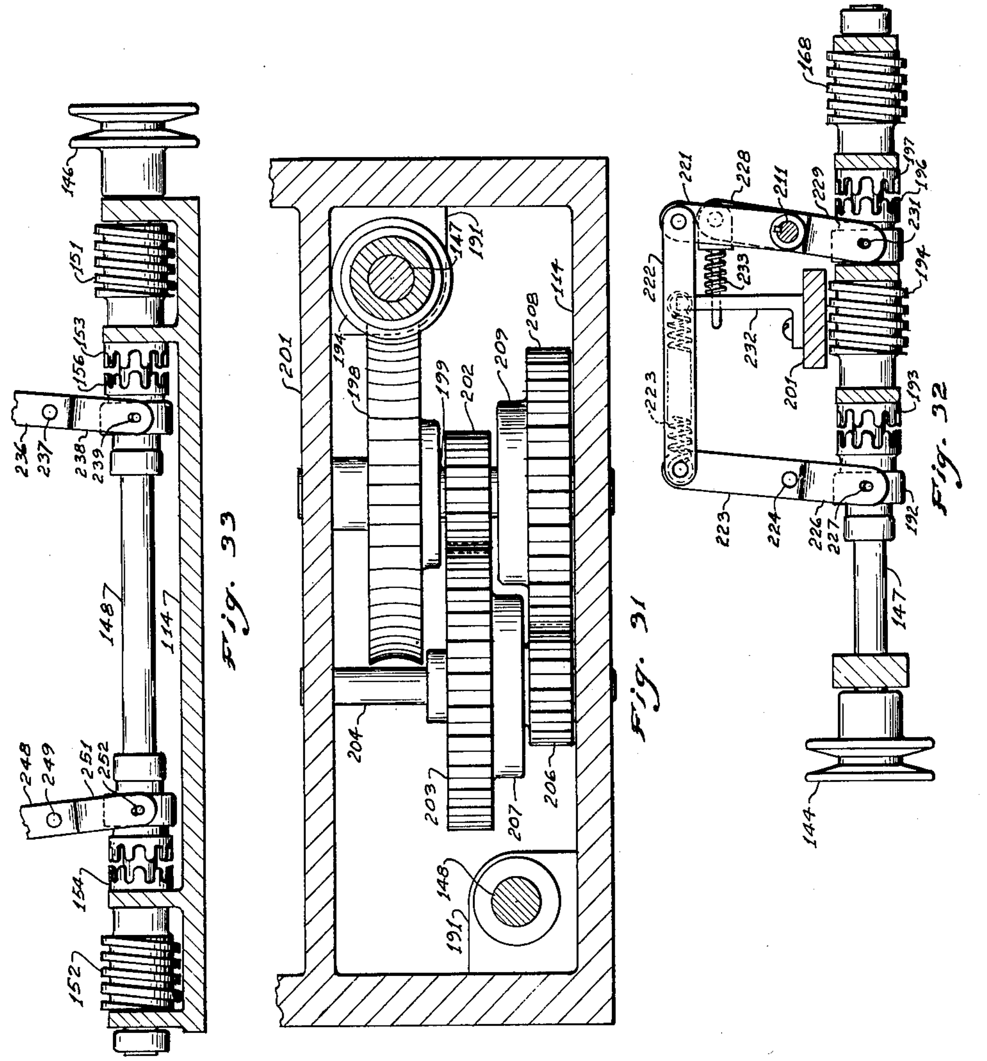

FIGS. 5 and 6 are transverse sectional views taken on the lines 5—5 and 6—6, respectively, of FIG. 4 looking in the direction of the arrows;

FIG. 7 is a side elevational view of one of the filler sections of the boom;

FIG. 8 is an enlarged sectional view taken on the line 8—8 of FIG. 7 looking in the direction of the arrows and showing the external top end mount assembly in elevation;

FIG. 9 is a transverse sectional view taken on the line 9—9 of FIG. 7 looking in the direction of the arrows and showing the internal bottom end mount assembly in elevation;

FIG. 10 is an end elevational view of the internal bottom end mount assembly, the view being taken along the line 10—10 of FIG. 7 looking in the direction of the arrows;

FIG. 11 is a plan sectional view taken on the line 11—11 of FIG. 8 looking in the direction of the arrows;

FIG. 12 is a plan sectional view taken along the line 12—12 of FIG. 9 looking in the direction of the arrows;

FIG. 13 is a vertical sectional view taken on the line 13—13 of FIG. 8 looking in the direction of the arrows;

FIG. 14 is a sectional view taken on the line 14—14 of FIG. 9 looking in the direction of the arrows;

FIG. 15 is a fragmentary plan view partly in longitudinal section showing the butt section, the figure being broken away to conserve space;

FIG. 16 is a fragmentary sectional view partly in elevation showing a sheave detail;

FIG. 17 is a fragmentary vertical portion of the butt section partly in elevation taken along the line 17—17 of FIG. 15 looking in the direction of the arrows;

FIG. 18 is a plan sectional view of a portion of the tip section showing the shrink cable equalizer and load cable idler sheave, the view being taken substantially along the line 18—18 of FIG. 19 looking in the direction of the arrows;

FIG. 19 is a sectional view taken along the line 19—19 of FIG. 18 showing both load cable idler pulleys, the head cable fastener, and the stretch cable idler sheave which equalizes loading on the two stretch cables;

FIG. 20 is an enlarged fragmentary sectional view comprising an enlargement of a portion of FIG. 4;

FIG. 21 is a sectional view taken on the line 21—21 of FIG. 20 looking in the direction of the arrows and showing the overlapping lock blocks of two boom sections;

FIG. 22 is a sectional view similar to FIG. 21 but showing a fastening bolt secured through the lock blocks to maintain the sections in permanently extended position;

FIG. 23 is a schematic view showing the relationship of the head load stretch and shrink cables, the sheaves which control them, and the drums which control their take-up and pay-out;

FIG. 24 is a partially enlarged plan view of the crane carriage body with the covering housing removed, showing the cable drums and a portion of the cable drum drive engagement;

FIG. 25 is a plan sectional view taken approximately on the line 25—25 of FIG. 1 looking in the direction of the arrows and showing a portion of the cable drive mechanism below the cable take-up drums;

FIG. 26 is a longitudinal vertical sectional view taken on the line 26—26 of FIG. 25 looking in the direction of the arrows;

FIG. 27 is a longitudinal vertical sectional view taken on the line 27—27 of FIG. 25 looking in the direction of the arrows;

FIG. 28 is a transverse sectional view taken on the line 28—28 of FIG. 26 looking in the direction of the arrows (the figure can also be considered as being taken on the line 28—28 of FIG. 27);

FIG. 29 is a transverse sectional view taken on the line 29—29 of FIG. 27 looking in the direction of the arrows and showing illustrative clutch control lever mechanism;

FIG. 30 is an end elevational view looking along the line 30—30 of FIG. 27;

FIG. 31 is a transverse sectional view taken on the line 31—31 of FIG. 24 looking in the direction of the arrows, showing particularly the turn table drive mechanism;

FIG. 32 is a longitudinal sectional view taken on the line 32—32 of FIG. 25 looking in the direction of the arrows, showing the controls associated with shaft 147 which drives the load cable drum and the turn table; and FIG. 33 is a longitudinal sectional view taken on the line 33—33 of FIG. 25 looking in the direction of the arrows and showing the controls associated with shaft 148 which drives the head cable drums and the shrink and stretch cable drums.

The crane of my invention as shown in the drawings is built along the general conventional lines of a truck type crane with some of the showing simplified in order better to bring out the significantly new relationship of the parts. As shown the truck crane comprises a truck body illustrated generally by the reference character 51 with a conventional type cab 52 for driving the same, a boom carriage 53 generally rotatable with respect to the truck body, and an adjustable length boom comprising butt section 54, filler sections 55 and 56, and tip section 57. The boom is controllable in a manner conventional to booms in cranes of this type, but is also adjustable lengthwise and has provisions for load control, as will be made apparent as the description progresses. For convenience, reference will first be made to the structure of the boom itself.

Reference should first be made to FIG. 7 showing the filler boom section 55 which is typical in general construction of all the sections. Section 55 includes a bottom internal end mount assembly indicated generally by the reference character 58, an external top end mount assembly indicated generally by the reference character 59, and an intermediate or strut portion with diagonal truss members 61 and longitudinal truss members comprising four internal right angular members 62 and four external right angular members 63. As appears clear, particularly from FIGS. 8–12, the diagonal truss members 61 have their ends extending between the longitudinal truss members 62 and 63 at the corners; and the entire strut comprising the longitudinal and diagonal members is secured together, preferably by welding, to produce a strong unitary structure. The spacing of the longitudinal angular truss members 62 and 63 adds to the strength, and their placement is such as to provide a smooth track for bearing wheels on mutually telescoping boom sections, as will be made clear in subsequent description.

The internal bottom end mount assembly 58 is shown particularly in FIGS. 7, 9, 10 and 12, and reference may also be made to FIG. 20 where the relationship of the external and internal mounts at full extension of the boom is shown. While the internal mount assembly 58 may be constructed in various ways, I have found by actual experiment that fabrication from steel plate produces a very suitable type of structure with adequate strength.

As shown in the figures particularly called out in reference to internal mount assembly 58, the frame comprises top, bottom and side plates welded together at their edges to form a square 64, a top bulkhead 66 (see FIG. 9) and a bottom bulkhead 67 (FIG. 10) being welded to the square 64 to form a rigid structure. The square 64 comprising the four side members is also dimensioned so as to fit snugly within the inner longitudinal truss members 62, and the welding of these members together produces a strong end mount attached integrally to the intermediate strut portion of the section. As shown particularly in FIGS. 7, 9, 10 and 14, a portion of the square 64 is bent at 68 to extend inwardly diagonally to form inwardly tapered portions 69; and ears 71 are bent at an angle to form spaced pairs to receive stub shafts 72 acting as axles for internal diagonal bearing wheels 73. The diagonal portion 69 and ears 71 project within the longitudinal truss members 62 and 63 so that there is no interference with the diagonal bearing wheels 73, and the outer peripheries of these wheels extend beyond the strut portion of the scetion comprising the diagonal and longitudinal truss members, as shown particularly in FIG. 10. Accordingly the diagonal bearing wheels 73 can ride on the inner angle of the longitudinal truss member 62 of a mutually telescoping boom section and still leave ample clearance between the strut portions of the sections. It should be noted also that the peripheries of the bearing wheels 73 are shaped to provide the maximum bearing surface against the longitudinal internal truss members. It will be noted too that the bottom bulkhead 66 is aligned with and welded to the inwardly sloping portions 69; and the inwardly sloping portions 69 at suitable locations are provided with cable passing apertures 74, the purpose of which will appear later. Central holes 76 and 77 in the top and bottom bulkheads provide for passage of a shrink cable as will appear later.

Two cables are used to extend the boom length, which would normally be called extender or extension cables but which for simplicity I have termed throughout "stretch cables." Means must be provided on the internal bottom end mount assembly 58 for entrainment of these cables to adjustably support the section as will be explained. As shown, this support is in the form of two sheaves 78 secured on the inwardly tapered portion 69 of the mount 58 by means of pins 79 carried by bosses 81. The bosses are suitably secured to the framework of the mount 58 by welding, and for simplicity of showing I have not illustrated any particular bearing or attaching mechanism (see particularly FIG. 12) because conventional bearing and attaching means of several types may be used. It will be noted, however, that the bosses 81 support the pins 79 at such an angle that one edge of the cable sheaves 78 (the bottom edge, looking at FIGS. 9 and 10) is located outside the truss portion of the section on which it is supported, and another edge (the top edge in FIGS. 9 and 10) is located entirely within the truss portion of the section. Note also by reference to FIG. 10 that the inner edges or peripheries of the sheaves 78 are in line with the apertures 74. Thus, for reasons which will be explained later, the stretch cable can be extended longitudinally on the outside of section 55 (or any other section as required), passed over the sheave 78, and by means of such sheave 78 carried to a position on the inside of the strut portion of the boom section. At top and bottom of the internal bottom end mount assembly 58 an extending lock block 82 is secured as by welding, each block 82 having an opening 83 for receipt of a bolt or the like for holding the sections together in extended relation.

The external top end mount assembly of the boom section 55, indicated generally by the reference character 59, is shown particularly in FIGS. 8, 11 and 13. This mount is also preferably formed from steel plate and comprises top, bottom, and side members together defining a square frame portion 84. The frame portion 84 comprises the four plates welded together at their corners. The plates forming the frame portion 84 also extend around and are welded to the outside surface portion of the longitudinal truss members, as shown particularly in FIG. 8. Top and bottom bearing wheels 86 are secured on shafts 87 carried in projections 88 and 89 from the square frame portion 84. As shown in FIG. 11 the projection 89, while generally tubular, is secured as by welding to a web running transversely of the square 84. A longitudinally extending rib 85 integral with a rib beneath a projection 90 at the sides of the end mount assembly 59 provides with projection 91 support for bearing wheels 92 secured on shafts 93 journaled in such projections. At the location of each of the bearing wheels 86 and 92, the square frame portion 84 is recessed so that a portion of these bearing wheels extends within the mount 59 and within the truss portion formed by the diagonal and longitudinal truss members. As is clear by reference to FIG. 5, for example, these bearing wheels ride on the external surface of the longitudinal truss member of a mutually telescoping section, in this particular case section 56 when reference is being made to parts of section 55.

The external end mount assembly 59 also must make provision for receipt of and proper operation of the stretch cable. To this end, sheaves 96 are rotatably secured on an embossed and strengthened portion on the inside of the square frame 84; but as FIG. 8 shows, they are recessed from the outer peripheries of the bearing wheels 92 so that a boom section telescoped within section 55 would not engage or rub against such sheaves. It will be noted that the sheaves 96 are not offset or obliquely placed in any manner, so that a cable entrained around such a sheave will still remain in the same relative position with respect to the inside and/or outside of the section to which the sheave 96 is attached.

The external end mount assembly 59 is also provided at top and bottom with lock blocks 97 and bolt holes 98. When the boom is entirely extended, the lock blocks 82 and 97 overlap with bolt openings 83 and 98 aligned, as shown particularly in FIGS. 21 and 22. Thus a bolt 99 or the like can be employed to lock the sections together as shown in FIG. 22 when there is occasion to use the boom in this manner.

Basically the construction of the boom sections may be identical with that shown for filler section 55, as illustrated in FIG. 7, except principally for structural departures required at the bottom of the butt section and top of the tip section. For convenience, therefore, the reference characters employed in connection with a complete showing of the details of filler section 55 are applied to identical or substantially identical structures in related sections. As the description progresses and distinctions in structure must be pointed out, other reference characters will be employed to identify distinguishing parts. In other words, generally speaking, except for size, where the same reference characters are employed throughout the drawings the parts may be considered identical.

Looking now to the butt section as shown particularly in FIGS. 15–17, it utilizes the same diagonal truss members 61 in longitudinal truss members 62 and 63 as does the filler section 55 described in detail hereinabove, and also has the same general type of external top end mount assembly except for modifications for cable control. Notwithstanding the fact that some minor structural differences are present, the external top end mount assembly of the butt section is indicated by the reference character 59. It has bearing wheels 86 and 92, and is secured by welding to the external longitudinal truss member 63. Offset portions 102 are provided in the frame portion of the butt section top end mount, however, as shown particularly in FIG. 16, for reception of sheaves 103 journaled in bosses 104 secured as by welding to the offset portion 102. As will be seen at top and bottom of FIG. 15, the sheaves 103 function to displace the line of the stretch cable from the outside to the inside of the truss portion of the butt section.

The bottom mount of the butt section, generally indicated by the reference character 105, has a square frame 106 formed by welding together suitably shaped steel plates with a bulkhead 107. Projecting from the square portion 106 is a pair of outwardly extending portions 108, each provided with bifurcations 109 supported on transverse shaft 111. The shaft 111 may comprise a part of the drive mechanism, and by reference to FIGS 15, 17, 26 and 30 it will be noted that shaft 111 runs transversely of the crane carriage and is supported by standards 112 and side plates 113, both projecting upwardly from a bottom frame member 114. The standards 112 are shown integral with a frame support 115 (see FIGS. 25 and 30) integral with and projecting upwardly from frame 114. As FIG. 15 shows, but as will be described in greater detail hereinbelow, a drum 116 is mounted on and driven by transverse shaft 111 and carries shrink cable 117 which engages positioning sheave 118 and extends upwardly through all of the top and bottom bulkhead holes 76 and 77 for attachment, as will be explained, to the tip section. Drums 119 (FIGS. 15, 17, 25 and 28) carry stretch cables 121 which engage over positioning sheaves 122 mounted on the side of square frame 106, thence to the exterior portion of sheaves 103 on the top mount assembly 59, and thence to the inside of the butt section as shown particularly in FIG. 15. The full course traversed by the shrink and stretch cables and the manner in which these cables operate the boom sections will be explained in connection with the operation of the crane.

It will be noted that sheaves 122 are mounted on the projecting ends of a transverse shaft 123, and that the shrink cable-positioning sheave 118 is mounted substantially centrally of a shaft 124. These two shafts therefore tend to still further strengthen the bottom end mount assembly 105 of the butt section without interfering in any way with cable displacement. In FIG. 17 the parts are shown in the positions they would occupy if the boom were substantially horizontal, and the cables 117 and 121 slope rather sharply downwardly from their operating drums to their positioning sheaves 118 and 122, respectively. This angularity is changed markedly when the boom is projecting upwardly at approximately a 45° angle, which is generally the mean position it will have during regular lifting and load-controlling operations.

Figure 3:
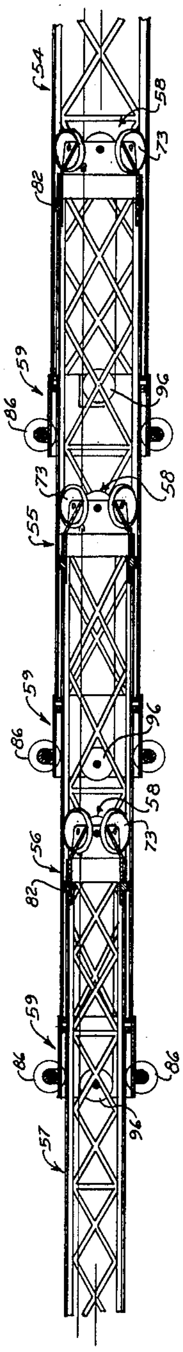
FIG. 3 is a fragmentary vertical sectional view of the boom taken on the line 3—3 of FIG. 2 looking in the direction of the arrows.

The tip section 57 is particularly shown in FIGS. 18 and 19. The internal bottom end mount assembly of the tip section, not specifically shown except insofar as it appears in FIGS. 2–4, has the same construction as shown in FIGS. 9, 10 and 14, although, of course, the cross section would be smaller so that the tip section could telescope within the filler section 56. The filler section has the same diagonal truss members 61 and longitudinal truss members 62 and 63 heretofore described in connection with filler section 55. In place of the usual external top end mount assembly found in the remaining section, however, tip section 57 has an especially shaped end mount assembly 126 formed of steel plate and welded together to provide a square portion secured by welding to the exterior of the four longitudinal truss members 63. From the square portion, the top end mount of the tip section flares inwardly at 127 to form a pair of parallel plates 128. The plates also extend upwardly and downwardly to produce upper extension and lower extension, all comprising continuations of plates 128 so that such plates 128 are substantially parallel throughout. As in other structures shown, suitable cross bracing (not shown) may be used as strength and use require.

Between the plates 128 load cable idler sheaves 129 and 131 are mounted, each on a suitable transverse stub shaft, also anchoring pins 132 and 133 for attachment of links 134 and 136. Link 134 is attached to the head cable as indicated in FIG. 1 and as will be explained in more detail hereinafter. Link 136 is attached to one end of a coil spring 137, the other end of which is attached to the upper end of shrink cable 117. This structure is employed to provide an equalizing function which will be explained hereinbelow.

Also secured to the top horizontal plate portion of the mount 126 is a stretch cable equalizing sheave 138, the function of which also will be explained more fully hereinbelow. At this point it will be sufficient to note that there are two stretch cables for extending the boom wound on drums 119, and that the cable is taken up on these drums to extend the boom. Actually, however, in the construction shown, the two cables 121 comprise a single cable, the looped end of which engages around equalizing sheave 138. Thus if for any reason there should be any difference in the take-up on the two drums 119, there will be a slight resulting rotation of the sheave 138 and the tension on the two stretch cables will always remain substantially identical.

In FIG. 19 it will be noted that I have shown a pair of sheaves 140 placed generally in the same position as sheaves 78 in the butt and filler sections. These sheaves 140 are attached at an angle to the bottom internal end mount assembly of the tip section of the boom. They receive the cable from sheave 96 on filler section 56; the cable passes between sections 56 and 57 to the outside of sheave 140 (note the slanting shaft in FIG. 19) where it is then guided to within the tip section 57 and then up to equalizer sheave 138. There is a section of the stretch cable 121 on each side and two such sheaves 140. The cable is guided from one sheave 140 around equalizer sheave 138 back to the second sheave 140, this portion at all times being within the tip section 57. It should be noted that the stretch cables 121 could merely be anchored to the outside bottom end mount of the tip section and the boom of my invention operated in substantially the same way. The sole function of the sheaves 140, positioned like sheaves 78, is to take the stretch cables to a position within the tip section so that the strain thereon may be equalized in the manner shown and described.

Before further reference to the manner in which the mechanically adjustable length of the boom is controlled, reference will be made to FIGS. 24–33. It should be understood that the power utilized for movement of the crane and adjustment of the boom may be any power commonly available for the purpose. For illustration only I have indicated in FIG. 24 an internal combustion engine 141 suitably mounted on a frame portion of the crane carriage and driving a pulley 142 which in turn drives a belt or chain 143 engaging pulleys 144 and 146. For simplicity I have shown a common type of V-belt with matching pulleys normally not used when more than minimum horse power is being handled; but those skilled in the art will understand that I may use any of the usual drive mechanisms for rotating shafts 147 and 148 to the ends of which the pulleys 144 and 146, respectively, are pinned. The shafts 147 and 148 are therefore continuously driven in accordance with the direction imparted to the belt 143 by the pulley 142. A reverse gear mechanism 149 is provided between the engine 141 and the pulley 142. Here again I wish to point out that for simplicity of illustration so that those skilled in the art will understand the manner in which my invention is practiced I have shown conventional, simple mechanical clutch, drive, and control mechanisms. Electrical and servo type controls, fluid types such as hydraulic clutches, and other drive control and reversing mechanism very common in this art may be used in place of the relatively simple mechanical expedients which I have illustrated.

It should be pointed out also that using the reversing mechanism 149 to simultaneously change the direction of rotation of both the shafts 147 and 148 places a limitation on the manner in which certain of the controls may be operated simultaneously. It is preferable, therefore, to use reversing mechanism within the control member itself.

One of the features of my invention is the ability to use my improved crane exactly as an ordinary crane without my improvements. Still another advantage is the automatic pay-out of both the load cable and head cable as the boom is extended. The control and drive mechanism illustrated performs this type of function, which is novel in the crane of my invention and which I have therefore illustrated at the expense of more elaborate showing of conventional type of controls.

Loosely mounted on shaft 148 is a pair of worms 151 and 152 to which are secured clutch members 153 and 154, respectively. Clutch member 153 is adapted to be engaged by clutch member 156 which is splined to shaft 148 and adjustable to engage clutch member 153 for driving worm 151. Similarly, clutch member 157 splined to shaft 148 will drive worm 152 through clutch member 154. Worm 152 engages worm wheel 158 (see FIG. 30) mounted on transverse shaft 111. Also mounted on this shaft are shrink cable drum 116 and gears 159. Gears 159 engage gears 161 integral with stretch cable drums 119. To support the drum 119 and gear 161 assemblies, a transverse shaft 162 is mounted between side frame plates 113. The righthand drum 119 (looking at FIG. 28) is directly journaled on shaft 162, and the lefthand drum 119 is journaled on a sleeve 163 integral with load cable drum 164. The assembly comprising the drums 119 and load cable drum 164 is positioned on shaft 162 on one side by a filler block 166 and on the opposite side by a worm gear 167 pinned to the sleeve 163 and driven by worm 168 mounted on shaft 147 (see FIGS. 26 and 25). Worm 151 drives worm wheel 169 (FIG. 24) secured to shaft 171 which also carries drums 172 controlling the head cable.

Looking particularly at FIGS. 1 and 24 it will be seen that a head cable 173 is wound on the drums 172, engages over idler sheaves 174 carried by the carriage frame, and loops around an equalizer sheave 176 which may also be seen in FIG. 23. The head cable equalizer sheave 176 is carried by a bracket 177 attached to a cable 178, the other end of which is secured to the link 134 shown in FIG. 1 but particularly illustrated in FIG. 19.

Looking at FIG. 26, the crane carriage frame 114 is mounted on the truck body 179 through a vertical post 181, and a turn table 182 is provided with suitable rollers, ball bearings or the like to permit free relative movement. Within the carriage and above the frame 114 a gear 183 is keyed to shaft 181, the bottom end of the shaft 181 also being keyed to a support 184 comprising a portion of the turn table 182. The frame 114 moves with respect to the shaft 181 to swing the boom of the crane, and a suitable bearing 186 is provided between the frame 114 and the shaft 181.

The drive for swinging the crane is between shaft 147 and gear 183. The gear train is particularly shown in FIG. 31 but may be observed also by reference to FIGS. 25–27. Shaft 147 driven by pulley 144 is journaled in projecting frame portions 191, the same means being provided at the opposite side of the carriage for journaling shaft 148. A clutch member 192 is splined on shaft 147 and is movable longitudinally thereof to engage a matching clutch member 193 which in turn rotates worm 194 which is loose on shaft 147. Similarly a splined and longitudinally adjustable clutch member 196 is adapted to engage a clutch member 197 which drives worm 168.

Worm 194 engages worm wheel 198 journaled on a vertical supporting shaft 199 which has its ends engaging respectively in the frame 114 and a transverse frame member 201. Spur gear 202 rotates with worm wheel 198 and engages a larger gear 203 which is journaled on a vertical shaft 204 also supported on frame 114 and cross frame member 201 and spaced laterally from shaft 199. A spur gear 206 rotates with gear 203, being spaced therefrom as shown in FIG. 31 by a hub 207. Spur gear 206 engages a drive gear 208 which is journaled on shaft 199 independently of the worm gear 198, a spacing hub 209 also being provided at this location to align gears 206 and 208. Gear 208 meshes directly with gear 183, as particularly illustrated in FIG. 26.

The actual drives for the turn table, load cable, and head cable have been pointed out; it remains only to show the manner in which such drives are controlled, and to describe the drive gear train for the stretch cable. I wish first to point out, however, that the shrink cable drum 116 used to control the boom is driven automatically in a reverse direction to the stretch cable drums 119 shown particularly in FIGS. 24 and 28. Looking particularly at FIGS. 24, 27, 28 and 30, worm 152 on shaft 148 drives worm wheel 158 which in turn drives shaft 111 and gears 159 to turn the stretch cable drums 119 by engagement of their integral gears 161. This of course drives the drums 119 in a direction opposite to the direction of movement of shaft 111. Since the shrink cable drum 116 is also secured to shaft 111, it is always driven with drums 119 but in an opposite direction therefrom.

The simple mechanical control mechanism illustrated in the drawings utilizes a transverse control shaft 211 on which is loosely mounted a transverse sleeve 212 (see particularly FIG. 29). An upwardly projecting lever 213 mounted on shaft 211 is utilized for operating the turn table. An upwardly projecting lever 214 secured to sleeve 212 operates the load cable drum. Upwardly projecting lever 216 loosely mounted on shaft 211 controls the head cable drums. Lever 217 controls the stretch cable drums and, through a linkage which will be described, simultaneously controls the load cable and head cable drums.

Looking now first to the control lever 213 and its control of the turn table, an upright projection 221 from shaft 211 engages a link 222 which in turn engages the top of a bell crank lever 223 pivoted at 224 to the frame. The bottom of bell crank lever 223 forms a yoke 226 which engages projecting pins (as may be seen in FIG. 25) 227 on the movable clutch member 192. By manipulation of lever 213 through the rockable transverse control shaft 211 and linkage shown, the clutch members 192 and 193 may be engaged to drive worm 194 and thus turn the turn table gear train illustrated particularly in FIG. 31. Suitable means such as a tension spring 225 shown in FIG. 32 is provided to return the control members to clutch-disengaging position. In view of the reversing gear mechanism 149, the shaft 147 may be driven in either direction and the turn table likewise driven in either direction. Those skilled in the art will understand, as mentioned briefly hereinabove, that this drive mechanism is shown in a simplified form for convenience of illustration, and that normally a control mechanism would be employed for directly controlling drive of the turn table in either direction regardless of the direction of movement of other portions of the drive mechanism.

To control the load cable 164 the lever 214 is operated to rock the sleeve 212, carrying with it projecting lever 228 (see particularly FIGS. 29 and 32). The bottom of lever 228 is shaped to form a yoke 229 which engages around pins 231 on movable clutch member 196, whereby clutch member 196 may be caused to drive driven clutch member 197 which in turn drives the load cable driving worm 168. A bracket 232 supports a spring 233 in compression against an upper portion of lever 228 to return the control members to clutch-disengaging position when the lever 214 is released.

To operate the head cable drums, lever 216 engages one end of a link 234, the opposite end of which is pivoted to the top of a control arm 236 (FIGS. 27 and 33) pivoted to the frame at 237 and having an integral yoke 238 engaging pins 239 of the driving clutch member 156. The top of arm 236 also engages a rod member 241 which slides in an upper projection 242 from the frame member 201 to compress a return control spring 243.

The stretch cable drums 119 driven by the worm 152 are controlled by the control lever 217 but concomitantly the shrink cable, load cable and head cable drums are also operated. To accomplish this result a downwardly projecting portion of lever 217 carries a pin 246 which engages in slots in downwardly projecting portions of the load cable controlling lever 214 and the head cable controlling lever 216. This structure is particularly brought out in FIGS. 27 and 29. This permits both of the levers 214 and 216 to be operated independently. When lever 217 is operated, however, the transverse pin 246 engages ends of the slots in which it will normally ride in the levers 214 and 216 and carries them with it. Those skilled in the art will understand that there are many electronic, hydraulic, electro-mechanical, servo and other type mechanisms for securing this same result.

To control the stretch cable drums themselves, control lever 217 is provided with a pair of links 247 which are pivoted to the top of an arm 248 movable about a pivot 249 on the carriage frame portion. The lower portion of arm 248 comprises a yoke 251 engaging pins 252 on the driving clutch member 157 splined to shaft 148 whereby it may be caused to engage driven clutch member 154 to drive worm 152. As already explained, worm 152 drives worm wheel 158 which directly drives the shrink cable drum 116, and the stretch cable drums 119 are driven in the opposite direction through the gears 159 and 161.

By reference to FIG. 23 the general arrangement of cables and driving drums may be seen in exploded schematic form. The various cables, sheaves, and drums bear the same reference characters as used hereinabove in the detailed description. The load cable 256, which has not heretofore been referred to, extends from the load cable drum 164 over tip section idler sheaves 129 and 131 to support a load indicated generally by the reference character 257.

While only a single load cable is shown, it should be borne in mind that any of the usual load cable arrangements common in the art may be used such as a double cable, both of which may be used to carry the load, or one to carry the load and one to control it by means of what is sometimes called a whip cable. In other words, the improved crane of my invention is adapted to use any of the conventional expedients for load handling, load control and the like common in the art and any of the usual constructions not inconsistent with the functions provided by my improved boom and boom control construction.

I have not shown a so-called anchor cable commonly used to prevent the boom from being raised to a completely vertical position, nor have I shown any of the commonly employed bracing mechanism to permit operating the boom in a direction transversely of the normal direction of movement of the truck frame on which it is carried. These are conventions readily added but are not shown in the drawings because they do not relate specifically to the novel features disclosed.

Generally speaking, while the crane of my invention may be any desired size, it normally will find its greatest utility if used in the ten to thirty ton crane capacity.

The number of filler sections and the relative length of the various sections may vary, but generally speaking there must be at least one filler section (preferably at least two), and the length of the sections should match except for the normally extending top tip mount and bottom butt mount which perform special functions. Since the external and internal top and bottom end mounts limit the telescoping and extension of the sections, it is preferable to have the strut portion between the end mounts as long as possible consistent with requisite strength. In any given construction the percentage of the section taken up by the end mounts will always be the same; and it is advisable, consistent with strength, to keep that percentage as small as possible. In a preferred design using four sections—namely a butt section, tip section, and two filler sections—substantially as shown in the drawings, the boom has a length fully retracted of 40 feet and a length fully extended of 120 feet.

The operation of the improved crane of my invention should in general be amply clear from the above detailed description. Assuming a truck type crane as shown, the operator is always ready to go to a new job and will never need to have more than about 40 feet of boom or "stick" to move through the city streets or on the highway. When he reaches the job he can extend the boom to the requisite length and then operate the crane in exactly the same manner as conventional cranes without the improvements of my present invention. He may, however, use the extendable boom itself as a control device wherever the nature of the work might make such control desirable.

With the ordinary crane, if the purpose is to pick a load up from the ground and place it on an elevated position, or, conversely, to take it from an elevated position and lower it to the ground, the operator must first place the crane truck in a suitable position for swinging movement and then control the load from a lower to an upper elevation or vice versa by swinging the crane in the process of raising or lowering the load. With the crane of my invention it is possible, for example, to pick up a load with a short boom and, without moving the truck wheels, simply extend the boom and shove the load through a window if necessary.

In this connection it should be noted that since the head cable and load cable drums are operated with the stretch cable drums that extend the boom, neither the angularity of the boom nor the position of the load or "hook" with respect to the idler sheave 131 will be affected by either extension or retraction of the boom. Using simple mechanical drive means and simple mechanical drive means-control mechanism shown in the drawings for the purpose of simplicity, it is impossible to operate the head cable and load cable independently while the stretch cables and shrink cable are being operated. Those skilled in the art will understand, however, that with conventional type controls provision may be made to operate the head cable or load cable either automatically directly with the stretch cable or while the stretch cable is being operated at a greater or lesser speed so that either automatic or manual control of the load will be possible.

Normally during the operation of the crane of my invention the boom sections will be left free to mutually telescope in response to the controls, and a locking bolt 99 or the like (as shown in FIG. 22) will not be used. Using a conventional crane, however, any two or more of the boom sections can be secured together in this fashion if circumstances indicate a need therefor. For example, if the crane is to be used for a considerable period of time at maximum extension, it might be desirable to bolt all of the sections together to relieve the strain on the stretch cables. The boom construction, however, may also be used as a tower or derrick to support, for example, oil drilling equipment, in which case the boom comprising the tower or derrick would be fully extended and the sections bolted together while the tower or derrick was in use. In this connection I have made provision for two bolts at each point where the sections overlap at full extension; but any suitable number of lock blocks and attaching bolts may be provided.

Figure 2:
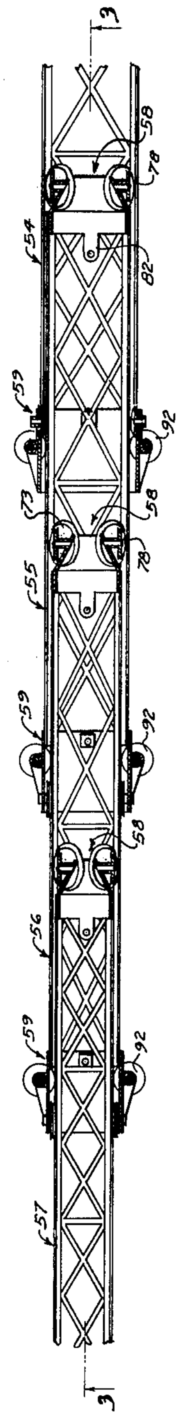
FIG. 2 is a fragmentary sectional view taken on the line 2—2 of FIG. 1 looking in the direction of the arrows, the two filler sections illustrated being shown complete but with the butt and tip sections broken away to conserve space.

By reference particularly to FIG. 23 as well as to FIGS. as well as to FIGS. 2 and 4 and sections taken thereon (note the enlarged section, FIG. 20, also), it will be seen that what apparently comprises two stretch cables is in reality a single stretch cable, the top end of which is looped around the equalizing sheave 138. It is of course obvious that any suitable number of stretch cables could be employed and they could be placed at any desired location around the boom sections, providing the structure used caused the cable to be moved between successive pairs of boom sections such as by means of tilted sheaves 78 as shown. By placing the two stretch cables at the sides of the boom, however, and joining them together at the top around an equalizing sheave, the minimum load is placed on the cables and the load is always equalized regardless of any tendency of the boom to bend with the load. Actually, if one could be assured that the two stretch cable drums 119 would always take up and pay out the cable equally, it would not be necessary to utilize the equalizing sheave 138. In this connection it should be noted that the expected minor variances in take-up of the shrink cable and stretch cables make it necessary to use the equalizing spring 137 (see FIG. 19). Actually during normal operations when the boom is elevated there is substantially no need for the shrink cable because the boom will return to retracted position by its own weight. If the stretch cables are slackened, it is when the boom is in a near-horizontal position that the shrink cable is necessary to positively retract the boom. Another function of the shrink cable is to maintain a slight tension on the stretch cables at all times to prevent any possibility of their riding out of their sheaves.

During the time the boom is in use unless it is in fully retracted position or partially or fully extended position with anchoring bolts 99 in place, the boom is held in extended position by tension on the stretch cables. When the boom is fully extended the stretch cables are taken up on the stretch cable drums 119, and the minimum amount of stretch cable is paid out. Looking at FIG. 23, for example as the boom is extended the sheaves 78 and 96 are brought closer together, and the amount of cable between these sheaves is of course reduced as the cables are taken up on the drums 119. It will be noted that since the boom is held in extended relation by the stretch cables, a failure, if it occurs, is most likely to be of such cables, and any failure is a "safe" failure in that the boom merely collapses by telescoping action bringing the load to the ground in the process. In other words, the construction of my invention does not add a failure problem substantially different from those encountered in the operation of standard type cranes. In this connection and from the standpoint of control generally, it should be understood that slip clutches, brakes, and other such features common to the crane art may be used with my invention to minimize failure and provide better load and adjustment control.

The additional amount of cable used with my invention does not present a serious problem. The load, head and other cables common to the industry are replaced in the usual manner. To replace the stretch and shrink cables, the boom is dropped to a generally horizontal position and supported in such position on suitable blocking or cribbing. New cables may be spliced to ends of the shrink and/or stretch cables and the latter used to draw the new cables into position. To first string the shrink and stretch cables it is advisable to use a small pilot cable first, and use it in the same way to pull the working cables into position. While the shrink and stretch cables of necessity pass over sheaves which apply bending stresses, there is no action to cause kinking such as will result in early cable failure. Because of the additional control provided, the load cable of my crane also is subject to less than normal amount of failure.

I have described one embodiment of my invention in detail so that those skilled in the art may understand the same. The scope of the invention, however, is defined in the claims.

I claim:

1. In a crane or the like, a boom comprising a butt section, a tip section, and at least one filler section in mutual telescoping relation, and cable means for controlling the telescoping relation of the sections to control the boom length, said cable means including a stretch cable extending successively from top portion of one section to a bottom portion of a telescoped section in such a manner that shortening such stretch cable extends the boom, a shrink cable extending substantially from bottom to top of the boom so that shortening said shrink cable retracts the boom, and a single control means for operating said stretch and shrink cables simultaneously in directions to adjust the boom length and to support the boom in such a manner that control of the length of the boom is a function of its normal operation.

2. In a crane or the like, a boom comprising a butt section, a tip section, and at least one filler section in mutual telescoping relation, a load cable pivoted to said tip section and cable means for controlling the telescoping relation of the sections to control the boom length without affecting the load supported on the load cable, said cable means including a stretch cable extending successively from top portion of one section to a bottom portion of a telescoped section in such a manner that shortening such stretch cable extends the boom, and a shrink cable extending substantially from bottom to top of the boom so that shortening said shrink cable retracts the boom, power means for operating said stretch and shrink cables together in opposite directions to support the boom in such a manner that control of the length of the boom is a function of its normal operation, and power means responsive to change in the boom length for operating the load cable to automatically maintain its effective length independent of the effective length of the boom.

3. In a crane or the like, a boom comprising a butt section, a tip section, and at least one filler section in mutual telescoping relation, a head cable supporting said boom at an angle to the horizontal and cable means for controlling the telescoping relation of the sections to control the boom length, said cable means including a stretch cable extending successively from top portion of one section to a bottom portion of a telescoped section in such a manner that shortening such stretch cable extends the boom, and a shrink cable extending substantially from bottom to top of the boom so that shortening said shrink cable retracts the boom, power means for operating said stretch and shrink cables together and in opposite directions to support the boom in such a manner that control of the length of the boom is a function of its normal operation, and means for automatically driving said head cable to maintain said boom angle independent of any operation of said stretch and shrink cables.

4. In a crane or the like, a boom comprising a butt section, a tip section, and at least one filler section in mutual telescoping relation, a load cable sheave on said tip section, a load cable drum, a load cable on said drum and extending the length of the boom and over said load cable sheave, a head cable supporting said boom at an angle to the horizontal, a head cable drum, means for operating either of said drums to operate said load cables and head cables independently, and cable means for controlling the telescoping relation of the sections to control the boom length, said cable means including at least one stretch cable extending successively from top portion of one section to a bottom portion of a telescoped section in such a manner that shortening such stretch cable extends the boom, a stretch cable drum, a shrink cable extending substantially from bottom to top of the boom so that shortening said shrink cable retracts the boom, a shrink cable drum, means for opening said stretch cable drum and shrink cable drum together to change the length of said boom, and means responsive to operation of the stretch cable drum and shrink cable drum for operating said load cable drum and head cable drum to automatically maintain the position of a load with respect to the tip section and the angle of the boom with respect to the horizontal.

5. In a crane or the like, a boom having a plurality of mutually telescoping sections, cable means for controlling the overlapping relation of such telescoping sections to control the boom length, a load cable carried by the boom and dependable from the boom tip, a drum operable to control the effective pay out length of the load cable, and means for controlling responsive to control of the boom length for operating said load cable drum in a direction to maintain the effective length of the load cable substantially unchanged.

6. In a crane or the like, a boom having a plurality of mutually telescoping sections, cable means for controlling the overlapping relation of such telescoping sections to control the boom length, a load cable carried by the boom and dependable from the boom tip, a load cable drum, means for operating said load cable drum, means responsive to change in the length of the boom for controlling the pay out of the load cable to cause the relation of a load to the boom to remain unchanged when the said boom length-controlling means is operated, a head cable supporting the boom at an angle, a head cable drum, means for driving said head cable drum to control said boom angle, and means responsive to change in the boom length for driving said head cable drum to maintain the angle of the boom substantially unchanged regardless of its said length.

7. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the top section having a bottom internal end mount assembly, bearing wheels on each such mount assembly, the said sections being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as it moves between the sheaves on top and bottom end mount assemblies, and control means for simultaneously operating said shrink cable drum and stretch cable drum for dynamically controlling the length of the boom, whereby controlling the length of the boom may be an operating adjustment in the manipulation of a load carried by the boom tip section.

8. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the tip section having a bottom internal end mount assembly, bearing wheels on each such mount assembly, the said sections being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as it moves between the sheaves on top and bottom end mount assemblies, control means for simultaneously operating said shrink cable drum and stretch cable drum for dynamically controlling the length of the boom whereby controlling the length of the boom may be an operating adjustment in the manipulation of a load carried by the boom tip section, a load cable sheave on said boom tip, a load cable drum carried by the said carriage, a load cable wound on the drum and extending the length of the boom and around said load cable sheave to leave a suspended portion adapted to carry a load, means under the control of an operator for driving said load cable drum in either direction to raise and lower a load with respect to said boom tip, and means responsive to operation of said shrink cable and stretch cable drums in an opposite direction to automatically maintain the position of a load during adjustment of the boom length.

9. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the tip section having a bottom internal end mount assembly, bearing wheels on each such mount assembly, the said section being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as it moves between the sheaves on top and bottom end mount assemblies, control means for simultaneously operating said shrink cable drum and stretch cable drum for dynamically controlling the length of the boom, whereby controlling the length of the boom may be an operating adjustment in the manipulation of a load carried by the boom tip section, a load cable adjustable to extend a given length thereof from the boom tip to control the position of the supported load, and means for controlling the load cable automatically in response to control of the stretch cable so that the position of the load remains substantially unchanged when the length of the boom is changed.

10. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the tip section having a bottom internal end mount assembly, bearing wheels on each such mount assembly, the said sections being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as its moves between the sheaves on top and bottom end mount assemblies, control means for simultaneously operating said shrink cable drum and stretch cable drum for dynamically controlling the length of the boom, whereby controlling the length of the boom may be an operating adjustment in the manipulation of a load carried by the boom tip section, and means responsive to unequal cable movement by the shrink cable and stretch cable to equalize relative tensions of said cables.

11. In a crane or the like, a boom comprising a plurality of overlapping sections including a butt section, a tip section and at least one intermediate section, said sections being of general rectangular cross section and each having top and bottom end mount assemblies and integral strut portions with generally right angular longitudinal corner strut members forming smooth inner and outer tracks, said bottom end mount assembly of the butt section shaped for pivotal attachment to support the entire boom pivotally on a suitable base, said top end mount assembly of the tip section shaped to carry a load cable sheave, all the remainder of said end mount assemblies having bearing wheels to ride on said smooth tracks, the bearing wheels on the bottom end mount assemblies having their axes arranged in pairs at right angles to each other to cause their peripheries to ride on flat exterior portions of the longitudinal strut members and the bearing wheels on the top end mount assemblies having diagonal axes to cause their peripheries to engage internal right angular corner surface of the longitudinal strut members, cable means including a drum and stretch cable for mutually extending said sections to lengthen the boom, cables means including a drum and shrink cable for retracting said sections to shorten the boom, and control means for automatically operating said stretch cable drum and shrink cable drum together to dynamically control the length of the boom during its normal operation in supporting and moving a load.

12. In a crane or the like, a boom comprising a plurality of overlapping sections including a butt section, a tip section and at least one intermediate section, said sections being of general rectangular cross section and each having top and bottom end mount assemblies and integral strut portions with generally right angular longitudinal corner strut members forming smooth inner and outer tracks, said bottom end mount assembly of the butt section shaped for pivotal attachment to support the entire boom pivotally on a suitable base, said top end mount assembly of the tip section shaped to carry a load cable sheave, all the remainder of said end mount assemblies having bearing wheels to ride on said smooth tracks, the bearing wheels on the bottom end mount assemblies having their axes arranged in pairs at right angles to each other to cause their peripheries to ride on flat exterior portions of the longitudinal strut members and the bearing wheels on the top end mount assemblies having diagonal axes to cause their peripheries to engage internal right angular corner surface of the longitudinal strut members and a combination of cable devices to both extend and retract said boom so that it may be operated as an incident to control of an object carried by its load cables, said cable device comprising a drum and stretch cable for mutually extending said sections to lengthen the boom, cable means including a drum and shrink cable for retracting said sections to shorten the boom, and control means for automatically operating said stretch cable drum and shrink cable drum together to dynamically control the length of the boom during its normal operation in supporting and moving a load.

13. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the tip section having a bottom internal end mount assembly, bearing wheels on each such mount assembly, the said sections being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as it moves between the sheaves on top and bottom end mount assemblies, and means for operating said shrink cable drum and stretch cable drum for controlling the length of the boom, there being two stretch cables and two sets of sheaves along a median line at sides of the boom to provide a balanced support for the boom sections and equalize loading of the said stretch cables when bending stresses are applied to the boom under load.

14. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the tip section having a bottom internal end mount assembly, bearing wheels on each such mount assembly, the said sections being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as it moves between the sheaves on top and bottom end mount assemblies, and means for operating said shrink cable drum and stretch cable drum for controlling the length of the boom, there being two stretch cables and two sets of sheaves along a median line at sides of the boom to provide a balanced support for the boom sections and equalize loading of the said stretch cables when bending stresses are applied to the boom under load, including a transverse equalizing sheave on the tip section above the internal bottom end mount assembly thereof and a pair of idler sheaves on said tip section bottom end mount assembly, the said two stretch cables being continuous and extending around said idler and equalizing sheaves.

15. In a crane or the like, a boom comprising a butt section, a tip section and at least one filler section, each filler section comprising a top external end mount assembly, a bottom internal end mount assembly and an integral strut portion forming inner and outer smooth tracks, the butt section having a top external end mount assembly and the tip section having a bottom internal end mount assembly, bearing wheels on each such mount assembly, the said sections being in mutually adjustable telescoping relation with the bearing wheels of the end mounts riding on said smooth tracks, a shrink cable secured to the tip section, a carriage supporting the boom, a shrink cable drum on said carriage on which the shrink cable is wound, sheaves on each end mount assembly, a stretch cable drum carried by the carriage, a stretch cable wound on said drum and extending successively around a sheave on the top end mount assembly of the butt section then around a sheave on the bottom internal end mount assembly of the next telescoping section, then around a sheave on the external top end mount assembly of the last-mentioned section, and continuing in such manner through the sections to the internal end mount assembly of the tip section so that said sections are supported by the stretch cable, said cable extending in space between the sections, means for transferring the position of the stretch cable between the sections as it moves between the sheaves on top and bottom end mount assemblies, and means for operating said shrink cable drum and stretch cable drum for controlling the length of the boom, said strut portion of the sections comprising diagonal and longitudinal truss members, the latter comprising inner and outer right angles, and said bearing wheels on the internal end mount assemblies having substantially right angular peripheries to ride on said inner angles and the bearing wheels on the external end mount assemblies comprising a series of flat periphery wheels arranged in pairs at right angles to one another to ride on flat portions of the exterior outer angles.

16. In a crane or the like, a carriage, a generally rectangular boom comprising a butt section, a tip section and at least one filler section, each filler section comprising a top external end mount assembly, a bottom internal end mount assembly and an integral strut portion forming four inner and outer smooth corner tracks, the butt section having a top external end mount assembly, a bottom support pivotally connected to the carriage and an integral strut portion forming four inner and outer smooth corner tracks, and the tip section having a bottom internal end mount assembly, a tip end mount assembly and an integral strut portion forming four inner and outer smooth corner tracks, bearing wheels on each such end mount assembly, the said sections being in mutually adjustable telescoping relation with the bearing wheels of the end mounts riding on said smooth tracks, said bearing wheels on the internal end mount assemblies having substantially right angular peripheries and riding in the internal corner, and the bearing wheels on the external end mount assemblies, pairs of flat surfaced wheels at right angles to each other riding on flat surfaces of the external corner, a shrink cable secured to the tip section, a shrink cable drum on said carriage on which the shrink cable is wound, sheaves on each end mount assembly, a stretch cable drum carried by the carriage, a stretch cable wound on said drum and extending successively around a sheave on the bottom internal end mount assembly of the next telescoping section, then around a sheave on the external top end mount assembly of the last-mentioned section and continuing in such manner through the sections to the internal end mount assembly of the tip section so that said sections are supported by the stretch cable, said cable extending in space between the sections, means for transferring the new position of the stretch cable between the sections as it moves between the sheaves on top and bottom end mount assemblies, a load cable sheave carried by the tip section, a load cable drum on the carriage, a load cable extending from the drum over said sheave, means for operating said load cable drum to control the positions of a load supported by the booms, and means for simultaneously operating said shrink cable drum and stretch cable drum for dynamically controlling the length of the boom as an operating movement to control the position of a load carried by said load cable.

17. In a crane or the like, a carriage, a generally rectangular boom comprising a butt section, a tip section and at least one filler section, each filler section comprising a top external end mount assembly, a bottom internal end mount assembly and an integral strut portion forming four inner and outer smooth corner tracks, the butt section having a top external end mount assembly, a bottom support pivotally connected to the carriage and an integral strut portion forming four inner and outer smooth corner tracks, and the tip section having a bottom internal end mount assembly, a tip end mount assembly and an integral strut portion forming four inner and outer smooth corner tracks, bearing wheels on each such end mount assembly, the said sections being in mutually adjustable telescoping relation with the bearing wheels of the end mounts riding on said smooth tracks, said bearing wheels on the internal end mount assemblies having substantially right angular peripheries and riding in the internal corner, and the bearing wheels on the external end mount assemblies, pairs of flat surface wheels at right angles to each other riding on flat surfaces of the external corner, a shrink cable secured to the tip section, a shrink cable drum on said carriage on which the shrink cable is wound, sheaves on each end mount assembly, a stretch cable drum carried by the carriage, a stretch cable wound on said drum and extending successively around a sheave on the bottom internal end mount assembly of the next telescoping section, then around a sheave on the external top end mount assembly of the last-mentioned section and continuing in such manner through the sections to the internal end mount assembly of the tip section so that said sections are supported by the stretch cable, said cable extending in space between the sections, means for transferring the new position of the stretch cable between the sections as it moves between the sheaves on top and bottom end mount assemblies, a load cable sheave carried by the tip section, a load cable drum on the carriage, a load cable extending from the drum over said sheave, means for operating said load cable drum to control the positions of a load supported by the booms, and means responsive to movement of the shrink cable and stretch cable adjusting said load cable drum to maintain the effective load position of the load cable unchanged during adjustment of the boom length.

References Cited in the file of this patent

UNITED STATES PATENTS

| | | |
|---|---|---|
| 513,514 | Klonne | Jan. 30, 1894 |
| 1,345,304 | Zied | June 29, 1920 |
| 2,668,625 | Garland | Feb. 9, 1954 |
| 2,819,803 | Obenchain | Jan. 14, 1958 |
| 2,919,036 | Raymond | Dec. 29, 1959 |

FOREIGN PATENTS

| | | |
|---|---|---|
| 13,101 | Great Britain | June 23, 1899 |